United States Patent
McNeill et al.

(10) Patent No.: US 11,372,397 B2
(45) Date of Patent: Jun. 28, 2022

(54) SYSTEMS AND METHODS FOR USE IN FACILITATING A MANUFACTURING OPERATION

(71) Applicant: Honda Motor Co., Ltd., Tokyo (JP)

(72) Inventors: David J. McNeill, Delaware, OH (US); Robert Mark Ziccardi, Marysville, OH (US); Ryan Thomas Sonoda, Marysville, OH (US); Dylan Hickman, Dublin, OH (US); Brian D. Ayers, Hilliard, OH (US); Mark Blustein, Saitama-ken (JP); Derrick Ian Cobb, Delaware, OH (US); Andrew Kent Hittle, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 208 days.

(21) Appl. No.: 16/752,837

(22) Filed: Jan. 27, 2020

(65) Prior Publication Data
US 2021/0232130 A1 Jul. 29, 2021

(51) Int. Cl.
G05B 19/418 (2006.01)
H04W 4/46 (2018.01)
H04B 17/318 (2015.01)

(52) U.S. Cl.
CPC ... *G05B 19/41895* (2013.01); *G05B 19/4183* (2013.01); *H04B 17/318* (2015.01); *H04W 4/46* (2018.02)

(58) Field of Classification Search
None
See application file for complete search history.

(56) References Cited

U.S. PATENT DOCUMENTS

| | | | |
|---|---|---|---|
| 6,816,730 B2 | 11/2004 | Davies et al. |
| 8,248,963 B2 | 8/2012 | Kim et al. |
| 8,655,588 B2 | 2/2014 | Wong et al. |
| 9,580,285 B2 | 2/2017 | Wong et al. |
| 9,838,849 B2 | 12/2017 | Kusens et al. |
| 9,877,164 B2 | 1/2018 | Giordano et al. |
| 9,949,226 B1 | 4/2018 | Sun et al. |

(Continued)

FOREIGN PATENT DOCUMENTS

| | | |
|---|---|---|
| CN | 104135749 A | 11/2014 |
| CN | 107462868 A | 12/2017 |

(Continued)

*Primary Examiner* — Carlos R Ortiz Rodriguez
(74) *Attorney, Agent, or Firm* — Armstrong Teasdale LLP

(57) ABSTRACT

A system for use in facilitating a manufacturing operation that includes a wireless beacon paired with each vehicle of multiple vehicles routable along a production line in a sequence. The wireless beacon emits a signal containing information that identifies the paired vehicle. A wireless transceiver is at a predetermined location along the production line, and the wireless transceiver scans for the signal. A server device is in communication with the wireless transceiver. The server device stores pairing data of which wireless beacon is paired with each vehicle, and sequence data of the vehicles routed along the production line, and receives, from the wireless transceiver, a signal containing the information that identifies the paired vehicle. The server device also verifies, based on the pairing data, the sequence data, and the information in the signal, that an order in which the vehicles enter the predetermined location corresponds to the sequence.

20 Claims, 2 Drawing Sheets

(56) References Cited

U.S. PATENT DOCUMENTS

| | | |
|---|---|---|
| 9,998,857 B2 | 6/2018 | Kusens et al. |
| 2017/0339528 A1 | 11/2017 | Gronqvist et al. |
| 2018/0077532 A1 | 3/2018 | Wulff |
| 2018/0253104 A1 | 9/2018 | Miyamoto et al. |
| 2018/0292216 A1 | 10/2018 | Jimenez et al. |
| 2019/0020978 A1 | 1/2019 | Finschi et al. |

FOREIGN PATENT DOCUMENTS

| | | |
|---|---|---|
| CN | 108287330 A | 7/2018 |
| DE | 102016109936 A1 | 11/2017 |
| EP | 3232221 A1 | 10/2017 |

SYSTEMS AND METHODS FOR USE IN FACILITATING A MANUFACTURING OPERATION

BACKGROUND

The present disclosure relates generally to mass production facilities and processes and, more specifically, to systems and methods of identifying unique products and enabling work to be done on the products based on the identification.

In some known manufacturing processes, it is important to know what type of product has entered a defined work zone along a production line. In vehicle production, for example, some known vehicles have identical body styles, but some may be equipped with different build features. As such, each vehicle may have a different set of build parameters associated with the different build features that need to be identified before work can be performed. In at least some known facilities, a production associate uses a handheld barcode scanner to scan a document associated with the vehicle in a work zone. Identification and build feature data obtained from the scan may then be used to retrieve build parameter information associated with the vehicle. However, manually scanning each vehicle at each work zone is a laborious and time-consuming task that consumes valuable production time.

BRIEF DESCRIPTION

In one aspect, a system for use in facilitating a manufacturing operation is provided. The system includes a wireless beacon paired with each vehicle of a plurality of vehicles routable along a production line in a sequence. The wireless beacon is configured to emit a signal containing information that identifies the paired vehicle. A wireless transceiver is at a predetermined location along the production line. The wireless transceiver is configured to scan for the signal. A server device is in communication with the wireless transceiver. The server device is configured to store pairing data of which wireless beacon is paired with each vehicle, and sequence data of the plurality of vehicles routed along the production line, and receive, from the wireless transceiver, a signal containing the information that identifies the paired vehicle. The server device is also configured to verify, based on the pairing data, the sequence data, and the information in the signal received from the wireless transceiver, that an order in which the plurality of vehicles enter the predetermined location corresponds to the sequence.

In another aspect, a manufacturing facility is provided. The facility includes a production line, wherein a plurality of vehicles are routable along the production line in a sequence. A wireless beacon is paired with each vehicle on the production line, and is configured to emit a signal containing information that identifies the paired vehicle. A wireless transceiver is at a predetermined location along the production line. The wireless transceiver is configured to scan for the signal. A server device is in communication with the wireless transceiver. The server device is configured to store pairing data of which wireless beacon is paired with each vehicle, and sequence data of the plurality of vehicles routed along the production line, and receive, from the wireless transceiver, a signal containing the information that identifies the paired vehicle. The server device is also configured to verify, based on the pairing data, the sequence data, and the information in the signal received from the wireless transceiver, that an order in which the plurality of vehicles enter the predetermined location corresponds to the sequence.

In yet another aspect, a method for use in facilitating a manufacturing operation is provided. The method includes pairing a wireless beacon with each vehicle of a plurality of vehicles that are routed along a production line in a sequence, and storing, in a server device, pairing data of which wireless beacon is paired with each vehicle, and sequence data of the plurality of vehicles routed along the production line. The method also includes receiving, at a wireless transceiver at a predetermined location along the production line, a signal emitted from the wireless beacon, wherein the signal contains information that identifies the paired vehicle, transmitting, from the wireless transceiver to the server device, a signal that contains the information that identifies the paired vehicle, and verifying, based on the pairing data, the sequence data, and the information in the signal received from the wireless transceiver, that an order in which the plurality of vehicles enter the predetermined location corresponds to the sequence.

DETAILED DESCRIPTION

Figure 1:
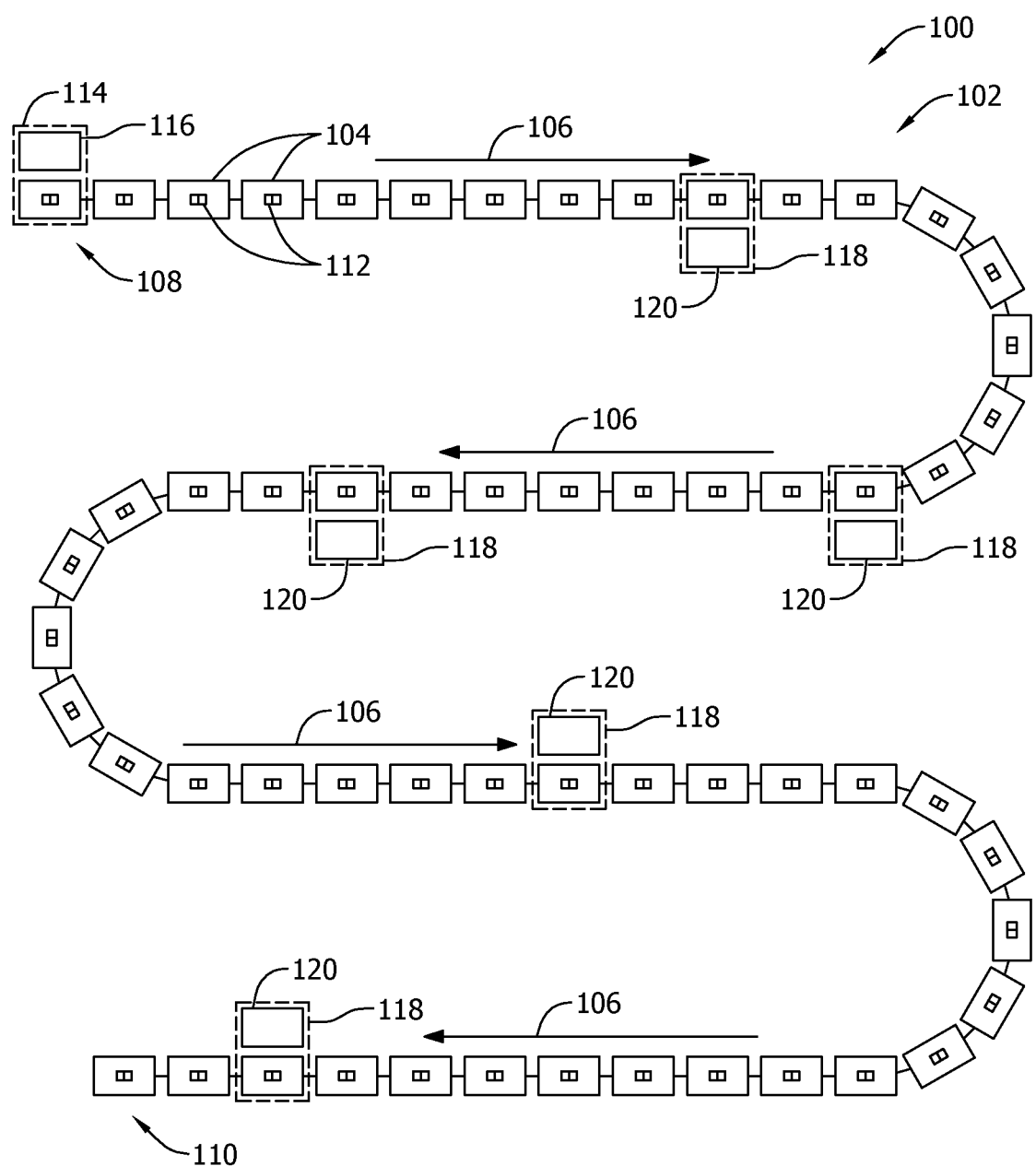
FIG. 1 is a plan view of an exemplary manufacturing facility.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

The embodiments described herein relate generally to systems and methods of identifying unique products and enabling work to be done on the products based on the identification. In the exemplary embodiment, the system includes a wireless beacon paired with each vehicle (i.e., the unique product) of a plurality of vehicles routable along a production line in a sequence. A wireless transceiver is at a predetermined location along the production line, and a server device is in communication with the wireless transceiver. As each vehicle enters the production line, pairing data of which wireless beacon is paired with each vehicle, and sequence data of the order in which the plurality of vehicles are routed along the production line, are generated and stored in the server device. As each vehicle is positioned at the predetermined location along the production line, a scan is performed by the wireless transceiver to determine which beacon, and thus which vehicle, is positioned at the predetermined location. For example, the data obtained from the scan is cross-referenced against the data stored in the server device. The cross-referencing enables identification of the vehicle, and verification that the vehicles are received at the predetermined location in the correct sequence, in a reliable, fast, and efficient manner. Based on the identification and verification, work may then be performed on the vehicle. As such, the systems and methods described herein facilitate reducing and/or eliminating human intervention and/or human error in a manufacturing process, and facilitate providing accurate location detection vehicle identification capabilities, thereby enabling an increased production output in the facility.

FIG. 1 is a plan schematic view of an exemplary manufacturing facility 100. In the exemplary embodiment, manufacturing facility 100 includes a production line 102 defined by a plurality of carriers 104 that are routable along production line 102 on a predetermined path in a direction of travel 106. Each carrier 104 is capable of receiving at least one product (not shown in FIG. 1) thereon, such as a vehicle. Accordingly, a plurality of products are likewise routable along production line 102 on the predetermined path. Production line 102 includes an entrance 108 and an exit 110. Each carrier 104 enters production line 102 at entrance 108, and receives a product thereon when positioned at entrance 108. Alternatively, carrier 104 enters production line 102 with the product already received thereon. Carriers 104 are routable in direction of travel 106 in a sequence towards exit 110, at which the product may be released from carrier 104 to enable carrier 104 to be rerouted towards entrance 108 for receiving an additional product.

Each carrier 104 has a wireless beacon 112 coupled thereto. Example wireless beacons include, but are not limited to, a Bluetooth® emitter, and a radio-frequency identification tag. Production line 102 includes a pairing zone 114 defined at entrance 108. As will be explained in more detail below, each product is unique in some way from the other products on production line 102, and may have identifying information associated therewith. At pairing zone 114, wireless beacon 112 and the product associated with a particular carrier 104 are paired such that wireless beacon 112 and the product are inextricably linked as carriers 104 are routed along production line 102. For example, in the exemplary embodiment, manufacturing facility 100 includes a work station 116 positioned at pairing zone 114, and a technician may manually input pairing data into work station 116 as each carrier 104 is routed through pairing zone 114. Sequence data, such as the sequence in which carriers 104 and associated products enter production line 102, may also be logged by the technician at work station 116. The sequence data may be defined by the sequence in which particular wireless beacons 112, associated with the carriers 104 and associated products, enter the production line 102.

Production line 102 also includes at least one work zone 118 defined at predetermined locations along production line 102. Work zone 118 includes equipment (not shown) for performing work on the product positioned on carrier 104. Exemplary equipment includes, but is not limited to, mechanical tools, diagnostic tools, and the like. Work zone 118 also includes a wireless system 120 positioned therein. Wireless system 120 receives at least one signal emitted by wireless beacons 112 that are in proximity to an associated work zone 118. As will be described in more detail below, wireless system 120 facilitates a manufacturing operation by verifying, based on the pairing data, the sequence data, and information contained in the at least one signal, that an order in which products are routed through an associated work zone 118 corresponds to the production sequence. As such, the verification facilitates performance of the correct work on the unique products routed through work zones 118.

Figure 2:
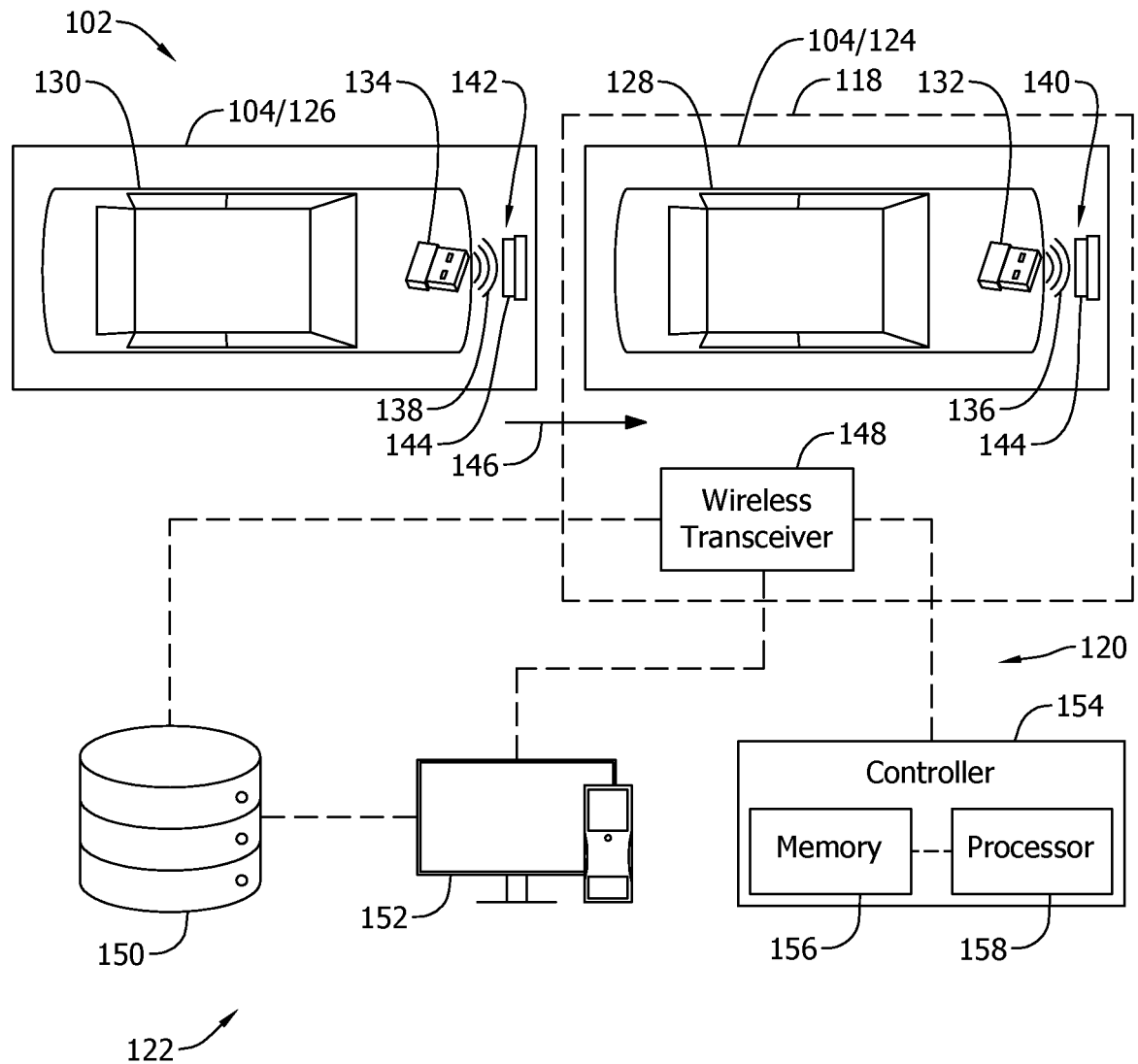
FIG. 2 is an illustration of a portion of the production line shown in FIG. 1 along with an exemplary identification system that may be used in the manufacturing facility shown in FIG. 1.

FIG. 2 is an illustration of a portion of production line 102 along with an identification system 122 that may be used in manufacturing facility 100 (shown in FIG. 1). In the exemplary embodiment, production line 102 includes carriers 104 aligned end-to-end with each other such that a single carrier 104 is positionable in work zone 118 at a time. Carriers 104 include a first carrier 124 positioned within work zone 118, and a second carrier 126 positioned outside of work zone 118. First carrier 124 has a first vehicle 128 positioned thereon, and second carrier 126 has a second vehicle 130 positioned thereon. In addition, first carrier 124 has a first wireless beacon 132 coupled thereto, and second carrier 126 has a second wireless beacon 134 coupled thereto. As described above, first wireless beacon 132 is paired with first vehicle 128, and second wireless beacon 134 is paired with second vehicle 130, as first carrier 124 and second carrier 126 enter production line 102. Accordingly, in operation, first wireless beacon 132 emits a first signal 136 that contains information (e.g., a vehicle identification number) that identifies first vehicle 128, and second wireless beacon 134 emits a second signal 138 that contains information that identifies second vehicle 130.

In addition, first carrier 124 includes a first panel 140 coupled thereto, and second carrier 126 includes a second panel 142 coupled thereto. First panel 140 and second panel 142 each have a layer 144 of radiation-absorbent material formed thereon. In one embodiment, the radiation-absorbent material is a foam material, and layer 144 is arranged in a pyramidal configuration that facilitates reducing signal emissions from layer 144. First panel 140 and second panel 142 are positioned to facilitate restricting the emission of first signal 136 and second signal 138 in at least one direction. For example, in the exemplary embodiment, first panel 140 is positioned to restrict emission of first signal 136 from first wireless beacon 132 in a forward direction 146 relative to first carrier 124 and first vehicle 128, and second panel 142 is positioned to restrict emission of second signal 138 from second wireless beacon 134 in forward direction 146 relative to second carrier 126 and second vehicle 130. A wireless transceiver 148 is positioned within work zone 118, and is positioned generally in forward direction 146 relative to second carrier 126 and second wireless beacon 134. Accordingly, second panel 142 is positioned to control the broadcast area of second signal 138 and to facilitate reducing signal noise received at wireless transceiver 148, thereby enhancing the accuracy of vehicle identification within work zone 118, as will be described in more detail below.

Identification system 122 includes wireless system 120, a server device 150, and a computing device 152. Server device 150 is in communication with work station 116 (shown in FIG. 1) for receiving pairing data and sequence data therefrom, and for storing the pairing data and sequence data therein for future reference and verification purposes. Wireless system 120 includes a wireless transceiver 148 and a controller 154 in communication with wireless transceiver 148. Wireless transceiver 148 is also in communication with server device 150 and with computing device 152. In operation, wireless transceiver 148 performs a scan for wireless signals, such as first signal 136 or second signal 138, on an active or passive basis. The results of the scan may be used to facilitate verifying that an order in which vehicles, such as first vehicle 128 and second vehicle 130, enter work zone 118 (i.e., a predetermined location) corresponds to the production sequence.

Controller 154 includes a memory 156 and a processor 158, comprising hardware and software, coupled to the memory for executing programmed instructions. The processor 158 may include one or more processing units (e.g., in a multi-core configuration) and/or include a cryptographic accelerator (not shown). Controller 154 is programmable to perform one or more operations described herein by programming memory 156 and/or processor 158. For example, processor 158 may be programmed by encoding an operation as executable instructions and providing the executable instructions in memory 156.

Processor 158 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 158, cause processor 158 to perform at least a portion of the functions described herein. The above examples are exemplary only, and thus are not intended to limit in any way the definition and/or meaning of the term processor.

Memory 156 is one or more devices that enable information such as executable instructions and/or other data to be stored and retrieved. Memory 156 may include one or more computer-readable media, such as, without limitation, dynamic random access memory (DRAM), synchronous dynamic random access memory (SDRAM), static random access memory (SRAM), a solid state disk, and/or a hard disk. Memory 156 may be configured to store, without limitation, executable instructions, operating systems, applications, resources, installation scripts and/or any other type of data suitable for use with the methods and systems described herein.

Instructions for operating systems and applications are located in a functional form on non-transitory memory for execution by processor 158 to perform one or more of the processes described herein. These instructions in the different implementations may be embodied on different physical or tangible computer-readable media, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 154 to permit access and/or execution by processor 158. In an alternative implementation, the computer-readable media is not removable.

In operation, first vehicle 128 enters work zone 118, and a scan for wireless signals, such as first signal 136 and second signal 138, is performed by wireless transceiver 148. The scan may be initiated manually or automatically as a result of a triggering event. For example, the scan may be initiated based upon the detection of motion within work zone 118. In at least some embodiments, wireless transceiver 148 receives at least first signal 136 and second signal 138 when the scan is performed. Controller 154 is then used to analyze the wireless signals received by wireless transceiver 148 to determine which vehicle is positioned within work zone 118.

The analysis is based on at least at least one of the following criteria: 1) a received signal strength indicator (RSSI) value of first signal 136 and second signal 138, 2) a comparison of each RSSI value to a threshold signal strength level, and 3) when more than one wireless beacon is paired with each vehicle, a count of first signals 136 and second signals 138 having an RSSI value equal to or greater than the threshold signal strength level. The location first wireless beacon 112 and second wireless beacon 112, and by proxy of first vehicle 128 or second vehicle 130, relative to work zone 118 may be determined based on an analysis of only one of the criteria listed above. However, determining the location of first wireless beacon 112 and second wireless beacon 112 based on an analysis of two or more of the criteria facilitates enhancing the accuracy of the determination.

In one embodiment, controller 154 uses an algorithm to determine which of first wireless beacon 112 or second wireless beacon 112 is positioned within work zone 118. For example, with reference to the criteria above, the algorithm includes comparing each RSSI value for the signals received by wireless transceiver 148 to a threshold signal strength value. Signals having an RSSI value less than the threshold signal strength value are omitted from further analysis in the algorithm, and the remaining signals are then analyzed. For example, the algorithm also includes analyzing a count of the number of signals received at wireless transceiver 148. The determined number of signals received is cross-referenced against the number of active beacons in identification system 122. If the number of signals received from a particular carrier 104 (shown in FIG. 1) is less than the number of active beacons on the particular carrier 104, it can be determined that the carrier associated with the beacons is not located in work zone 118. The algorithm also determines which of first wireless beacon 112 or second wireless beacon 112 is positioned within work zone 118 based on which of the received signals has a greater RSSI value. In general, the signal strength of emitted signals is progressively reduced as a distance between the source of the signals and the receiver of the signals is increased. As such, the algorithm determines which beacon is positioned within work zone 118 based on which signals have the greatest signal strength, as received at wireless transceiver 148.

After the determination of which wireless beacon is positioned within work zone 118 has been made, wireless transceiver 148 transmits a signal containing information that identifies the vehicle, paired with the wireless beacon, in work zone 118 (i.e., first vehicle 128) to server device 150. The identifying information may be derived from data contained within the wireless signal emitted from the wireless beacons. Based on the pairing data, the sequence data, and the identifying information in the signal, server device 150 is able to verify that an order in which vehicles enter work zone 118 corresponds to the production sequence, as determined at entrance 108 of production line (shown in FIG. 1).

For example, in the exemplary embodiment, the pairing data may be defined by identifying information of a vehicle (e.g., a VIN) that is linked with a particular wireless beacon 112 included on production line 102. Accordingly, server device 150 may receive the identifying information contained in first signal 136, and then analyze the pairing data to determine which wireless beacon 112 (i.e., first wireless beacon 112) is associated with the identifying information.

Server device 150 may then analyze the sequence data, which may be defined by an order that wireless beacons 112 are sequenced on production line 102, to determine the place in which first wireless beacon 112 should be positioned in the production sequence. If the expected position and the actual position of first wireless beacon 112 align, then it is verified that the correct vehicle is positioned within work zone 118.

After the verification is complete, server device 150 may provide a result of the verification to computing device 152. Computing device 152 is accessible by an operator (not shown). In one embodiment, server device 150 may also provide vehicle-specific manufacturing data to computing device 152 as a result of the verification. For example, each vehicle may have build features that are different from other vehicles on production line 102. Example build features include, but are not limited to, optional accessories (e.g., different types of roof configurations such as a sunroof, a panoramic roof, or a standard solid roof) and functionalities that are installed only on select models of the vehicles. By providing the vehicle-specific manufacturing data to computing device 152, the operator is provided with information on how to complete work on the vehicle position within work zone 118. The verification facilitates ensuring the accuracy of the manufacturing data provided to computing device. In an alternative embodiment, the vehicle-specific manufacturing data may be provided to manufacturing equipment within work zone 118, which is operable to work on the vehicles in an automated manner.

The embodiments described herein relate to systems and methods of facilitating a manufacturing operation for reducing human intervention and/or human error in a manufacturing process, and for providing accurate location detection capabilities, thereby enabling an increased production output in a manufacturing facility. The systems and methods described herein accomplish the aforementioned objectives by analyzing aspects of signals received at the vehicle parked in a work zone. The analysis enables the system to determine and/or confirm the location of the vehicle relative to the work zone in an at least partially automated manner.

Exemplary embodiments of an identification system are described above in detail. Although the systems herein described and illustrated in association with a manufacturing facility, the invention is also intended for use in any facility having a need to track objects processed therethrough. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in facilitating a manufacturing operation, the system comprising:
   a plurality of wireless beacons, a respective wireless beacon of the plurality paired with each vehicle of a plurality of vehicles that are routable along a production line in a sequence, each wireless beacon configured to emit a signal containing information that identifies the vehicle to which the respective wireless beacon is paired;
   a wireless transceiver at a predetermined location along the production line, the wireless transceiver configured to scan for the signal; and
   a server device in communication with the wireless transceiver, wherein the server device is configured to:
      store pairing data of which respective wireless beacon is paired with each vehicle, and sequence data of the plurality of vehicles routed along the production line;
      receive, from the wireless transceiver, a signal containing the information that identifies the vehicle to which the respective wireless beacon is paired; and
      verify, based on the pairing data, the sequence data, and the information in the signal received from the wireless transceiver, that an order in which the plurality of vehicles enter the predetermined location corresponds to the sequence.

2. The system in accordance with claim 1 further comprising a computing device in communication with the server device, wherein the computing device is accessible by an operator, and wherein the server device is further configured to provide a result of the verification to the computing device.

3. The system in accordance with claim 2, wherein the server device is further configured to provide vehicle-specific manufacturing data to the computing device when the order is verified.

4. The system in accordance with claim 1 further comprising a controller in communication with the wireless transceiver, the controller configured to determine a relative location of at least one vehicle to the predetermined location based on an analysis of a plurality of signals received by the wireless transceiver.

5. The system in accordance with claim 4, wherein the controller is configured to determine the relative location of each vehicle based on a received signal strength indicator (RSSI) value of the plurality of signals, a comparison each RSSI value to a threshold signal strength level, and a count of the plurality of signals having an RSSI value equal to or greater than the threshold signal strength level.

6. The system in accordance with claim 1 further comprising a panel that comprises a layer of radiation-absorbent material formed thereon, wherein the panel is associated with the respective wireless beacon and positioned to restrict emission of the signal from the respective wireless beacon in at least one direction.

7. A manufacturing facility comprising:
   a production line, wherein a plurality of vehicles are routable along the production line in a sequence;
   a plurality of wireless beacons, a respective wireless beacon of the plurality paired with each vehicle on the production line, each wireless beacon configured to emit a signal containing information that identifies the vehicle to which the respective wireless beacon is paired;
   a wireless transceiver at a predetermined location along the production line, the wireless transceiver configured to scan for the signal; and
   a server device in communication with the wireless transceiver, wherein the server device is configured to:
      store pairing data of which respective wireless beacon is paired with each vehicle, and sequence data of a plurality of vehicles routed along the production line;

receive, from the wireless transceiver, a signal containing the information that identifies the vehicle to which the respective wireless beacon is paired; and verify, based on the pairing data, the sequence data, and the information in the signal received from the wireless transceiver, that an order in which the plurality of vehicles enter the predetermined location corresponds to the sequence.

8. The manufacturing facility in accordance with claim 7, wherein the wireless transceiver is located at a work zone in which work is to be performed on each vehicle.

9. The manufacturing facility in accordance with claim 7 further comprising a computing device in communication with the server device, wherein the computing device is accessible by an operator, and wherein the server device is further configured to provide a result of the verification to the computing device.

10. The manufacturing facility in accordance with claim 9, wherein the server device is further configured to provide vehicle-specific manufacturing data to the computing device when the order is verified.

11. The manufacturing facility in accordance with claim 7, wherein the server device is further configured to at least one of generate or receive the pairing data in an order in which the plurality of vehicles enter the production line and then paired with the respective wireless beacon.

12. The manufacturing facility in accordance with claim 7 further comprising a controller in communication with the wireless transceiver, the controller configured to determine a relative location of at least one vehicle to the predetermined location based on an analysis of a plurality of signals received by the wireless transceiver.

13. The manufacturing facility in accordance with claim 12, wherein the controller is configured to determine the relative location of each vehicle based on a received signal strength indicator (RSSI) value of the plurality of signals, a comparison each RSSI value to a threshold signal strength level, and a count of the plurality of signals having an RSSI value equal to or greater than the threshold signal strength level.

14. The manufacturing facility in accordance with claim 7 further comprising a carrier configured to receive each vehicle and to transport each vehicle along the production line, wherein the respective wireless beacon is coupled to the carrier.

15. The manufacturing facility in accordance with claim 7 further comprising a panel that comprises a layer of radiation-absorbent material formed thereon, wherein the panel is associated with the respective wireless beacon and positioned to restrict emission of the signal from the respective wireless beacon in at least one direction.

16. A method for use in facilitating a manufacturing operation, the method comprising:

pairing a respective wireless beacon with each vehicle of a plurality of vehicles that are routed along a production line in a sequence;

storing, in a server device, pairing data of which respective wireless beacon is paired with each vehicle, and sequence data of the plurality of vehicles routed along the production line;

receiving, at a wireless transceiver at a predetermined location along the production line, a signal emitted from the wireless beacon, wherein the signal contains information that identifies the vehicle to which the respective wireless beacon is paired;

transmitting, from the wireless transceiver to the server device, a signal that contains the information that identifies the vehicle to which the respective wireless beacon is paired; and verifying, based on the pairing data, the sequence data, and the information in the signal received from the wireless transceiver, that an order in which the plurality of vehicles enter the predetermined location corresponds to the sequence.

17. The method in accordance with claim 16 further comprising initiating, by the wireless transceiver, a scan for the signal when a next vehicle in the sequence enters the predetermined location.

18. The method in accordance with claim 16, wherein pairing a respective wireless beacon comprises:

pairing the respective wireless beacon with a respective vehicle, as each vehicle enters the production line, to define the pairing data; and transmitting the pairing data to the server device for storage therein.

19. The method in accordance with claim 16 further comprising providing vehicle-specific manufacturing data to an operator at the predetermined location when the order is verified.

20. The method in accordance with claim 16 further comprising determining a relative location of each vehicle to the predetermined location based on an analysis of at least one of:

a determination of received signal strength indicator (RSSI) values for a plurality of signals received by the wireless transceiver;

a comparison of the RSSI values to a threshold signal strength level; or a count of the plurality of signals having an RSSI value equal to or greater than the threshold signal strength level.

* * * * *